United States Patent Office 3,238,120
Patented Mar. 1, 1966

3,238,120
ACTIVITY MAINTENANCE OF MOLECULAR SIEVE-BASED HYDROCRACKING CATALYST
Edwin Emile Sale, Baton Rouge, La., assignor to Esso Research and Engineering Company, a corporation of Delaware
No Drawing. Filed July 25, 1962, Ser. No. 212,463
18 Claims. (Cl. 208—111)

The present invention relates to the catalytic hydrocracking of hydrocarbons. It is more particularly concerned with the process wherein hydrocarbons are subjected to cracking in the presence of hydrogen and of a large pore zeolitic crystalline molecular sieve having uniform pore openings between 6 and 15 Angstrom units and composited or impregnated with or supporting a platinum group metal or platinum group metal compound. Still more particularly, the present invention relates to the cracking of hydrocarbons in the presence of hydrogen and a large pore molecular sieve composited with a metal or compound of the platinum group such as platinum, palladium, rhodium, osmium, iridium or the like, wherein the alkali metal content of the zeolitic support is less than 10% by weight of the support calculated as the alkali oxide. The invention is specifically concerned with the maintenance of the activity of such catalyst in the presence of deactivating amounts of nitrogen in the feed by subjecting said catalyst to a periodic hydrogen reactivation treatment.

Hydrocracking is a well-known refinery operation and many catalysts have been used or suggested for this purpose. In general, it finds its highest utility in cracking hydrocarbons boiling in the heavy naphtha and gas oil range. In general, hydrocracking may be applied to virgin and catalytic naphthas, gas oils, cycle oils and stocks from conventional cracking operations boiling generally in the gas oil range, and alkyl aromatics. Coker gas oils and naphthas, and feed deriving from shale may also be hydrocracked.

The hydrocracking process itself consists in passing the feed stock in admixture with hydrogen over the catalyst, if a fixed bed is used, or in contact with a moving bed or a fluidized bed of catalyst at temperatures between about 550° and 1000° F., pressures between 0 and 2000 p.s.i.g., preferably between about 200 and 1200 p.s.i.g. (fixed bed) and space velocities between 0.6 and 10.0 weights of feed per weight of catalyst per hour. Preferred hydrogen rates may range between 750 and 25,000 s.c.f. per barrel of hydrocarbon feed.

The catalysts that have been employed in this process have not been completely satisfactory for a number of reasons. Some catalysts have been found to be particularly sensitive to the presence of feed impurities, in particular to organic nitrogen. Such catalysts include the metals, oxides and sulfides of the iron group. These catalysts require frequent regeneration, or maintenance of reaction conditions not conducive to high yields of desired product. Other catalysts such as noble metals supported on conventional amorphous cracking catalysts, such as silica-alumina, silica-magnesia, silica-alumina-magnesia and the like, have also not shown as high an activity as is desirable, and also require regeneration more often than desirable. Many catalysts have high coke-forming tendencies, and also require relatively high pressures, which is expensive, as well as the requirement of feed purification.

A particular problem arises when high nitrogen containing stocks, such as total crudes, coker product, shale oil and the like, are hydrocracked. These oils may contain more than 50 and up to 40,000 parts per million of organic nitrogen. It has generally been found that as the nitrogen content of the feed increases, the conversion decreases and, for a given type of charge stock, the higher the nitrogen content the higher will be the temperature required to effect a given amount of conversion, all other conditions being constant. Also, since the amount of dry gas produced is directly related to temperature, higher nitrogen contents tend to produce higher quantities of dry gas and coke.

Another result of the presence of high nitrogen contents is that it has been necessary in the past to shut down the plant to regenerate the catalyst by burning off the deposits. As the catalyst builds up deposits resulting principally from nitrogen impurities, the reaction temperature must be increased if the degree of conversion is to be held constant. The dry gas and carbon make increases as the temperature increases. Thus, after a time, increasing the temperature to maintain a constant conversion level results in such change in product quality and distribution that plant shut down is necessary to regenerate the catalyst. Since the initial reaction temperature for high nitrogen charge stocks is higher than for low nitrogen stocks, the on-stream periods between regeneration will be shorter for high nitrogen than low nitrogen stocks. For this reason, many prior art hydrocracking processes require reduction of the nitrogen content before use of the charge stock to provide for longer periods between regeneration. This step is particularly important for these catalysts that are irreversibly poisoned by such feed impurities as nitrogen and sulfur compounds.

In accordance with the present invention there is employed as an outstanding hydrocracking catalyst a composition comprising a metal or compound of the platinum group, and preferably palladium, composited with, or incorporated within, but preferably deposited on a crystalline silica-alumina anionic network which has uniform size pore openings between about 6 and 15 Angstrom units, and which has been cationically exchanged to reduce its $Na_2O$ content, preferably to less than 10 wt. percent based on zeolite. It has been found that such hydrocarbon hydrocracking catalysts are not irreversibly poisoned by the nitrogen and sulfur contaminants, are highly effective in hydrocracking even very high nitrogen-containing feeds, such as coker oils, and may be restored to substantially initial activity by a hydrogen treatment at elevated temperatures.

The catalyst described above is particularly adapted to hydrocrack high nitrogen feedstocks, e.g., containing over 50, especially over 500, p.p.m. of nitrogen. Not only is the catalyst able to effect conversions into desirable products for a substantially longer period of time than prior art catalysts, but also it has been found that, on deactivation, a hydrogen treating step at elevated temperatures is sufficient to restore the catalyst to high activity without necessity for regeneration or even for removing the catalyst from the reaction zone.

Thus in accordance with the essence of the present invention, a high nitrogen containing hydrocarbon feedstock is hydrocracked in the presence of hydrogen and a palladium-containing molecular sieve catalyst having pore openings between 6 and 15 Angstrom units, preferably having a silica-alumina ratio of between 4 and 6; periodically the hydrocarbon feed is cut out, the temperature is raised above hydrocracking temperature and the hydrogen flow is continued for a period of time, 15 mins. to 16 hrs., to restore catalyst activity. It has been found that the hydrogen treat reactivates the present platinum group metal crystalline alumino-silicate catalyst for hydrocracking whereas there is little if any reaction of a platinum metal on amorphous silica-alumina by this technique.

The temperature required to reactivate the hydrocracking catalyst by the hydrogen treating technique normally depends both on the boiling range of the feed and the nitrogen content thereof. In general, hydrocracking is carried out at 400° to 800° F. The hydrogen reactivation is carried out at a somewhat higher, e.g., 100° F. higher, temperature than that of the hydrocracking reaction. The conditions for carrying out the reactivation process of the present invention include temperatures of about 600° to 1000° F., pressures of 0 to 1000 p.s.i.g., treating time of 0.25 to 16 hours and 50 to 2000 s.c.f. $H_2$/c.f. catalyst/hour.

Crystalline metallic alumino silicate zeolites, often loosely termed "molecular sieves" are well known in the art. They are characterized by their highly ordered crystalline structure and have pores of nearly uniform dimensions. The crystalline zeolites have an aluminosilicate anionic cage structure in which the alumina and silica tetrahedra are intimately connected to each other. The highly ordered dispersion of alumina and silica tetrahedra makes for a number of active sites and the uniform pore openings of the zeolites allow for easy ingress of certain molecular structures. It has been found that only the large pore crystalline alumino-silicate zeolites, i.e. effective pore diameters of 6 to 15 Angstroms, when composited with a platinum group metal and particularly after base exchange to reduce the $Na_2O$ content of the zeolite to less than 10 wt. percent are effective hydrocracking catalysts, particularly for high nitrogen feeds.

Naturally occurring examples of large pore crystalline alumino-silicate zeolites are the minerals faujasite and mordenite. Recently synthetic mordenite and the hydrogen form of mordenite, which have effective pore diameters of about 10 Angstroms, have become available in increased quantity (see Chem. and Engr. News, March 12, 1962). Synthetically produced alumino-silicate zeolites having large pore diameters have been termed in the industry as Type 13 molecular sieves, e.g. "13X" and "13Y" sieves. In general all the above crystalline alumino-silicate zeolites as formed contain a substantial portion of an alkali metal, normally sodium.

The catalysts of the present invention are such crystalline alumino-silicate zeolites having effective pore diameters of about 6 to 15 Angstroms, preferably 7 to 13 Angstroms, wherein a substantial portion of the alkali metal, e.g. sodium, has been replaced with a cation (either a metal cation or a hydrogen containing cation, e.g., $NH_4+$), so as to reduce the soda ($Na_2O$) content to less than 10 wt. percent and preferably to about 0.5 to 6 wt. percent (based on zeolite) and which is composited with a platinum group metal.

In general, the anhydrous form of the base exchanged large pore crystalline alumino-silicate zeolite prior to compositing with platinum group metal may be expressed in terms of mols as follows:

$$0.9 \pm 0.2 \ Me_{2/n}O : Al_2O_3 : X \ SiO_2$$

wherein Me is selected from the group consisting of hydrogen and metal cations (so that the $Na_2O$ content is less than 10 wt. percent of the zeolite), $n$ is its valence and X is a number from 2.5 to 14, preferably 3 to 10 and especially 4 to 6 (such silica to alumina ratios being more active, selective and stable than compositions of lower ratio). As employed in the hydrocracking reaction the zeolite has been base exchanged so that sodium represents a minor molar proportion of the metal represented as Me.

One way of making the "hydrogen" form of the sieve is to base exchange it with an ammonium cation solution and thereafter calcine. The step in which the "hydrogen" form or the $NH_4+$ form of the sieve is composited with the noble metal may be in the nature of a wet impregnation or a base exchange reaction. Thus a platinum or palladium salt or an ammonium complex of these elements, for instance, $Pt(NH_3)_4Cl_2$, ammonium chloroplatinate and many others may be used. The palladium salts such as $PdCl_2$ may also be used, either for impregnation or base exchange. The amount of catalytic metal in the finished catalyst is ordinarily between 0.01 and about 5.0 weight percent, preferably 0.1 to 3.0%. Normally the catalyst is subjected to a heat or hydrogen treat at elevated temperatures, e.g., 500° to 1500° F., to reduce the platinum group metal to, at least in part, its elemental metal state.

The catalyst used in the present invention may be subject to many variations. Though it finds its highest utility when a hydrogen atom replaces the bulk of the sodium atoms in the original sodium alumino-silicate, under certain circumstances it may be desirable to replace the sodium by other elements such as cobalt, nickel, zinc, magnesium, calcium, cadmium, copper, and barium, and employ the resulting crystalline compositions as a support for the platinum group metals. Such materials serve not only as the support for the platinum group metal catalyst, but also possess catalytic activity in their own right. Thus, such catalysts may serve a dual role for specific hydrocarbon conversion reactions. The other metal modifications of the absorbent may impart greater thermal stability to the noble metal catalyst composite.

The process of the present invention may be more fully understood by the following illustrative examples.

*Example 1*

A mixture of sodium aluminate, sodium hydroxide and silica sol was refluxed at about 210° F. in proportion and for a time to produce crystalline sieves having $SiO_2/Al_2O_3$ ratios of about 4 to 5.5. The sodium sieve was thereafter ion-exchanged with $NH_4OH-NH_4Cl$ solutions to produce a material having less than 10% soda, and preferably less than about 4%. The extent of base exchange is readily controlled by controlling contact time and number of exchanges. The resulting sieve was calcined to decompose the ammonium compound, thereafter reacted with a platinum or a palladium salt, such as ammoniacal $PdCl_2$, dried, pilled and recalcined, or the ammonium sieve may be treated (or reacted) directly with ammoniacal platinum or palladium salt solution to effect base exchange, filtered, dried, pilled, and then slowly heated and then finally calcined at 650° to 900° F. to form the so-called decationized form of the sieve containing the catalytic agent.

A sieve which had a $SiO_2/Al_2O_3$ ratio of about 5 and which contained 0.5% by weight of a palladium was tested for hydrocracking activity with various high nitrogen hydrocarbon feeds.

*Example 2*

These runs were carried out in a pilot plant, and data below summarize the results after 12 weeks operation.

| Feed | Light Catalytic Cycle Stock | |
|---|---|---|
| Catalyst | Pd/Large Pore Molecular Sieve | $Ni_3S_2/Al_2O_3-SiO_2$ |
| Pressure, p.s.i.g | 1,500 | 800 | 1,500 |
| V./v./hr. | 1.0 | 1.3 | 0.5 |
| Temperature, ° F. | 640 | 700 | 680 |
| Conversion, percent | 60 | 60 | 40 |
| Catalyst Deactivation Rate, ° F./Day | 0.3 | 0.4 | 1 |

The raw cycle stock contains about 50 p.p.m. of organic nitrogen compounds, and the nickel catalyst deactivates rapidly at temperatures above 700° F. Thus the nickel catalyst would have a life of about one month under the above conditions. On the other hand, at 1500 p.s.i.g, the Pd catalyst was not affected by temperatures up to 750° F., thus indicating a catalyst life of over a year at these conditions before regeneration is necessary. Furthermore, these data show that the palladium sieve catalyst may be employed at substantially less severe conditions of temperature and pressure than the nickel catalyst without loss of activity.

Example 3

When a very high nitrogen containing feed is hydrocracked, deactivation of course occurs far more rapidly than with the raw cycle stock of the preceding example. A coker gas oil, boiling in the range of 490° to 1000° F. containing 2072 p.p.m. of nitrogen compounds was studied with the sieve catalyst under hydrocracking conditions of 1000 p.s.i.g., temperature of 700° F. and feed rate of 0.5 v./v./hr.

The data in Table I show that there is a large loss of catalyst activity between runs when the catalyst was treated with a small flow of hydrogen (1–2 c.f./hr.) for 16 hours at 700° F. (Runs 142 and 143). Treating the catalyst with the same flow of hydrogen for 64 hours at this temperature increased catalyst activity, but this took an excessive period of time (Runs 143–144). On the other hand, increasing the temperature of the shorter (16 hour) treat to 750° F. improved catalyst activity only somewhat (Runs 145–146). However, when the temperature of the hydrogen treatment was raised to 800° F., catalyst activity was effectively maintained. As shown in Runs 147–151, activity of the catalyst was maintained virtually constant for 30 hours of operation when the catalyst was hydrogen treated after each six hour run; catalyst activity immediately declined when the treat was omitted (Runs 152–153). However, Run 154 shows that even an hour's treat at 800° F. with hydrogen was effective in improving the conversion of the gas oil over the catalyst.

TABLE I.—FEED COKER GAS OIL

| Run | Catalyst Reactivation Preceding Run | Temp. of Test, °F. | Run Length, Hrs. | Product Gravity, °API | Vol. percent Conversion 400° F.+ to 400° F.— |
|---|---|---|---|---|---|
| 141 | 16 Hrs. at 700° F., 1,000 p.s.i.g., No Hydrogen Flow | 718 | 2 | 67.0 | 84 |
| 142 | None; Run Directly Followed Run 141 | 733 | 2 | 66.8 | 84 |
| 143 | 16 Hrs. at 700° F., 1,000 p.s.i.g., Flow of H₂ over Cat. | 731 | 5 | 50.7 | 56 |
| 144 | 64 Hrs. at 700° F., 1,000 p.s.i.g., Flow of Hydrogen | 722 | 2 | 63.8 | 79 |
| 145 | 16 Hrs. at 700° F., 1,000 p.s.i.g., No Hydrogen Flow | 722 | 4 | 46.7 | 49 |
| 146 | 16 Hrs. at 750° F., 1,000 p.s.i.g., Flow of Hydrogen | 731 | 4 | 49.8 | 55 |
| 147 | 16 Hrs. at 800° F., 1,000 p.s.i.g., Flow of Hydrogen | 729 | 6 | 57.0 | 67 |
| 148 | do | 735 | 6 | 58.7 | 70 |
| 149 | do | 736 | 6 | 60.9 | 74 |
| 150 | 64 Hrs. at 800° F., 1,000 p.s.i.g., Flow of Hydrogen | 758 | 6 | 66.5 | 83 |
| 151 | 16 Hrs. at 800° F., 1,000 p.s.i.g., Flow of Hydrogen | 734 | 6 | 59.1 | 71 |
| 152 | 16 Hrs. at 700° F., 1,000 p.s.i.g., No Hydrogen | 738 | 6 | 34.4 | 28 |
| 153 | do | 715 | 2 | 33.4 | 27 |
| 154 | 1 Hr. at 800° F., 1,000 p.s.i.g., Hydrogen Flow | 724 | 2 | 41.1 | 40 |

Example 4

In Table II are shown results obtained in reactivating the same catalyst deactivated in hydrocracking a Southern Louisiana virgin gas oil containing a much lower nitrogen content of 112 p.p.m. This material had a boiling range of 390° to 850° F., and hydrocracking conditions included pressures of 1000 p.s.i.g. and feed rates of 1 v./v./hr. Because of the lower nitrogen content, the feed was not as refractory as the coker gas oil of Example 3, and thus conversions were carried out at a lower temperature. It was also found that the temperature required for catalyst reactivation by the hydrogen treating technique could be carried out at 700° F., a hundred degrees lower than in Example 3.

In both Examples 3 and 4 it is to be emphasized that the same catalyst charges were used throughout the series of runs, and that the catalysts were not regenerated at any stage.

TABLE II.—FEED—SOUTH LOUISIANA VIRGIN GAS OIL

| Run | Catalyst Reactivation Preceding Run | Temp. of Test, °F. | Run Length, Hrs. | Product Gravity, °API | Vol. percent Conversion 400° F.+ to 400° F.— |
|---|---|---|---|---|---|
| 217 | Hydrogen Flow, 16 Hrs. at 560° F., 1,000 p.s.i.g. | 567 | 2 | 60.4 | 73 |
| 218 | None. Run Directly Followed Run 217 | 568 | 3 | 55.7 | 66 |
| 219 | Hydrogen Flow, 16 Hrs. at 600° F., 1,000 p.s.i.g. | 565 | 6 | 54.4 | 64 |
| 220 | do | 566 | 6 | 50.6 | 68 |
| 221 | Hydrogen Flow, 64 Hrs. at 700° F., 1,000 p.s.i.g. | 566 | 5.5 | 57.8 | 69 |
| 222 | Hydrogen Flow, 16 Hrs. at 700° F., 1,000 p.s.i.g. | 569 | 6 | 56.2 | 67 |
| 223 | No Hydrogen, 16 Hrs. at 560° F., 1,000 p.s.i.g. | 567 | 6 | 47.9 | 49 |
| 224 | Hydrogen Flow, 16 Hrs. at 660° F., 1,000 p.s.i.g. | 566 | 2 | 49.5 | 57 |
| 225 | Hydrogen Flow, 1 Hr. at 700° F., 1,000 p.s.i.g. | 566 | 2 | 51.4 | 60 |
| 226 | Hydrogen Flow, 16 Hrs. at 700° F., 1,000 p.s.i.g. | 564 | 2 | 59.5 | 65 |

Example 5

The following example illustrates the unusual nature of the present hydrogen reactivation of a platinum group metal supported on an exchanged crystalline aluminosilicate zeolite as compared with substantially the same treatment of a platinum group metal on an amorphous silica-alumina base and particularly with respect to the ability of the thus treated catalyst to hydrocrack a high nitrogen feed. Comparison should be made with Example 3 which employed a catalyst exemplifying the present invention, i.e., 0.5 wt. percent palladium deposited on the hydrogen form of a crystalline alumino-silicate zeolite, for treating the same feedstock and being subjected to hydrogen reactivation.

A very similar catalyst of the prior art containing 0.5 wt. percent palladium supported on amorphous silica-alumina (3A base) was similarly treated employing the same coker gas oil (2,072 p.p.m. nitrogen) used in the experiments (Example 3) with the crystalline aluminosilicate catalyst containing palladium. The palladium on amorphous silica-alumina base was originally activated using the same procedure as employed with the catalyst of the present invention and was tested for hydrocracking ability at conditions of 700° to 750° F., 1000 p.s.i.g., 7000 s.c.f. hydrogen per barrel and a feed rate of 1 v./v./hr., these conditions being essentially the same as those in Example 3. Previous work on a crystalline catalyst indicates that hydrogen reactivation temperature should be about 100° higher than the temperature of the hydrocracking operation for activity maintenance and thus the palladium on amorphous silica-alumina catalyst was subjected to hydrogen reactivation at about 850° F.

Thereafter the hydrogen treated catalyst was employed for hydrocracking. The results are indicated in Table III.

TABLE III. HYDROGEN TREATING OF 0.5% PD ON AMORPHOUS SILICA/ALUMINA (3A)

Feed: Coker Gas Oil, 200 cc. Catalyst Charge.
Conditions of Test: 700 s.c.f. $H_2/B$, 100 p.s.i.g., 1 v./v./hr.

| Catalyst Activation Prior to Test | | | | Temp. of Test, °F. | Run Length, Hours | Liquid Product D+L at 430° F. | Vol. percent Conversion 430° F.+ to 430° F.− |
|---|---|---|---|---|---|---|---|
| $H^2$ Rate, s.c.f./hr. | Temp., °F. | Pressure, p.s.i.g. | Time, Hrs. | | | | |
| None (Fresh Catalyst Charge) | | | | 712 | 2 | 28 | 32 |
| | | | | 710 | 1 | 4.5 | |
| | | | | 759 | 2 | 5.5 | |
| 2 | 850 | 1,000 | 16 | 760 | 1 | 35 | 18 |
| | | | | 753 | 2 | 4.5 | |

As shown in Table III adequate reactivation of palladium on an amorphous silica-alumina base could not be achieved using the hydrogen treatment technique found to activate the catalysts of the present process. The amorphous silica-alumina catalyst prior to hydrogen treatment gave essentially no conversion of gas oil at 750° F. After a 16 hour hydrogen treat at 880° F. conversion improved for only a brief period of time, one hour or less. Conversion during a three hour period following "reactivation" was significantly less than that obtained at a lower average temperature during a five hour test prior to reactivation. While some improvement in liquid product was noticed in the first hour of operation after reactivation, the activity gain of the platinum group metal-amorphous silica-alumina catalyst was shortlived and conversion was essentially nil during the next two hours.

It thus becomes apparent that the hydrogen reactivation of the platinum group metal-crystalline aluminosilicate large pore zeolite catalyst offers substantial advantages in maintaining activity, such advantages not being anticipated in view of the little effect of hydrogen treatment on a platinum group metal supported on amorphous silica-alumina type catalyst.

Having described the present invention that which is sought to be protected is set forth in the following claims. What is claimed is:

1. An improved process for hydrocracking a high nitrogen hydrocarbon feed stock which comprises:
   (1) contacting said hydrocarbon feed stock, in the presence of added hydrogen, in a reaction zone maintained at hydrocracking conditions including a temperature of 400° to 800° F., with a catalyst comprising a crystalline alumino-silicate zeolite composited with a member of the group consisting of metals and compounds of the platinum group, said zeolite having uniform pore openings between about 6 and 15 A. and containing less than 10 wt. percent $Na_2O$, said contacting being continued for a sufficient period of time to at least partially deactivate said catalyst;
   (2) periodically interrupting contact between said feed stock and said catalyst and elevating the temperature of said reaction zone while continuing contact between said catalyst and hydrogen for a sufficient period of time to at least partially restore catalyst activity; and
   (3) thereafter reinstituting contact between said catalyst and said feed stock in the presence of hydrogen at hydrocracking conditions.

2. The process of claim 1, wherein said catalyst contains between 0.01 and 5 wt. percent platinum group metal.

3. The process of claim 2, wherein said platinum group metal is palladium.

4. The process of claim 1, wherein step (2) is conducted at a temperature of about 100° F. higher than step (1).

5. The process of claim 1, wherein said zeolite has been base-exchanged with a hydrogen-containing cation to thereby reduce its $Na_2O$ content, and wherein said platinum group metal is palladium.

6. The process of claim 1, wherein said feed stock contains over 500 p.p.m. nitrogen.

7. An improved process for hydrocracking a high nitrogen hydrocarbon feed stock which comprises:
   (1) contacting said hydrocarbon feed stock, in the presence of added hydrogen, in a reaction zone maintained at hydrocracking conditions including a temperature of 400° to 800° F., with a catalyst comprising a crystalline alumino-silicate zeolite composited with a platinum group metal, said zeolite having uniform pore openings of between about 6 to 15 A. and containing less than 10 wt. percent $Na_2O$, said contacting being continued for a sufficient period of time to substantially deactivate the catalyst;
   (2) periodically interrupting contact between said feed stock and said catalyst and elevating the temperature of said reaction zone to a value within the range of about 600° to 1000° F., while continuing contact between said catalyst and hydrogen for a sufficient period of time to substantially restore catalyst activity to the level existing just prior to said interruption; and
   (3) thereafter reinstituting contact between said catalyst and said feed stock in the presence of hydrogen at hydrocracking conditions.

8. The process of claim 7, wherein said catalyst contains between 0.01 and 5 wt. percent platinum group metal.

9. The process of claim 8, wherein said platinum group metal is palladium.

10. The process of claim 7, wherein step (2) is conducted at a temperature of about 100° F. higher than step (1).

11. The process of claim 7, wherein said zeolite has been base-exchanged with a hydrogen-containing cation to thereby reduce its $Na_2O$ content.

12. The process of claim 7, wherein the operating conditions in step (2) include a hydrogen rate of 50 to 2000 standard cubic feet per cubic foot of catalyst per hour, a pressure of 0 to 1000 p.s.i.g., and a treating time of 0.25 to 16 hours.

13. The process of claim 12, wherein said feed stock contains more than 500 p.p.m. nitrogen.

14. An improved process for hydrocracking a high nitrogen hydrocarbon feed stock containing more than 50 p.p.m. nitrogen which comprises:
   (1) contacting said hydrocarbon feed stock, in the the presence of added hydrogen, in a reaction zone maintained at hydrocracking conditions including a temperature of 400° to 800° F., with a catalyst comprising a crystalline alumino-silicate zeolite composited with a platinum group metal, said zeolite having uniform pore openings of between about 6 and 15 A. and containing less than 10 wt. percent $Na_2O$, said contacting being continued for a sufficient period of time to substantialy deactivate said catalyst and to achieve substantially equilibrium conditions;
   (2) interrupting contact between said feed stock and said catalyst and elevating the temperature of said reaction zone to a value within the range of about 600° to 1000° F. which is at least about 100° F. higher than said hydrocracking temperature, while continuing contact between said catalyst and hydrogen for a sufficient period of time within the range of 0.25 to 16 hours to substantially restore catalyst activity to the level existing just prior to said interruption; and (3) thereafter reinstituting contact between said catalyst and said feed stock at said hydrocracking conditions.

15. An improved process for hydrocracking a high nitrogen hydrocarbon feed stock containing more than 500 p.p.m. nitrogen which comprises:

(1) contacting said hydrocarbon feed stock in the presence of added hydrogen, in a reaction zone maintained at hydrocracking conditions including a temperature of 400° to 800° F., with a catalyst comprising a crystalline alumino-silicate zeolite composited with a platinum group metal, said zeolite having uniform pore openings of between about 6 and 15 Å. and containing less than 10 wt. percent $Na_2O$, said contacting being continued for a sufficient period of time to substantially deactivate said catalyst and to achieve substantially equilibrium conditions;

(2) periodically interrupting contact between said feed stock and said catalyst and elevating the temperature of said reaction zone to a value within the range of about 600° to 1000° F. while continuing contact between said catalyst and hydrogen at a pressure of 0 to 1000 p.s.i.g. and a hydrogen rate of about 50 to 2000 standard cubic feet per cubic foot of catalyst per hour, for a sufficient period of time within the range of 0.25 to 16 hours to substantially restore catalyst activity to the level existing just prior to said interruption; and (3) thereafter reinstituting contact between said catalyst and said feed stock at said hydrocracking conditions.

16. The process of claim 15, wherein said catalyst contains between 0.01 and 5 wt. percent platinum group metal.

17. The process of claim 16, wherein said platinum group metal is palladium.

18. The process of claim 17, wherein said zeolite has been base-exchanged with a hydrogen-containing cation to thereby reduce its $Na_2O$ content.

References Cited by the Examiner
UNITED STATES PATENTS

| | | | |
|---|---|---|---|
| 2,956,015 | 10/1960 | Hann | 260—676 |
| 2,971,904 | 2/1961 | Gladrow et al. | 208—135 |
| 2,983,670 | 5/1961 | Senbold | 208—111 |
| 3,048,536 | 8/1962 | Coonradt et al. | 208—110 |

DELBERT E. GANTZ, *Primary Examiner.*

ALPHONSO D. SULLIVAN, *Examiner.*